United States Patent

Moyse

[11] Patent Number: 6,135,593
[45] Date of Patent: Oct. 24, 2000

[54] MAGNIFYING SPECTACLES

[76] Inventor: Marjorie Anne Moyse, Sea Mist, Victoria Avenue, St. Helier, Jersey JE2 3LU, United Kingdom

[21] Appl. No.: 09/287,040

[22] Filed: Apr. 6, 1999

Related U.S. Application Data

[63] Continuation of application No. PCT/GB97/02733, Oct. 7, 1997.

[30] Foreign Application Priority Data

Oct. 7, 1996 [GB] United Kingdom ............ 9620889

[51] Int. Cl.[7] ...................................................... G02C 9/02
[52] U.S. Cl. .............................. 351/41; 351/59; 351/125
[58] Field of Search ................................ 351/41, 57, 59, 351/61, 125; 359/672, 819

[56] References Cited

U.S. PATENT DOCUMENTS 3,425,774  2/1969  Lindblom ............................... 351/61
3,549,245  12/1970  Bolden ................................... 351/61
3,840,294  10/1974  Kneier ..................................... 351/59

Primary Examiner—Huy Mai
Attorney, Agent, or Firm—McAulay Nissen Goldberg & Kiel, LLP

[57] ABSTRACT

Magnifying spectacles for cosmetic use including a cross piece which extends across the face of the user and projecting upwardly from which are two magnifying lenses whose size is not substantially larger than that of the human eye. The crosspiece includes a bridgepiece which extends over the bridge of the nose of the user and whose apex is situated forwardly of the lenses. The crosspiece is connected at each end of the respective side arm which extends towards a position midway up the height of the ear of the user and terminates in an ear engagement portion. The ear engagement portion includes a portion which extends upwardly along the front of the ear over a substantial proportion of its height. The eyebrows of the user are thus wholly exposed and may be plucked with the aid of the magnifying lenses and a mirror. The lenses are pivotally mounted on the crosspiece and may thus be pivoted in turn away from the associated eye to permit the application of cosmetics to that eye.

7 Claims, 1 Drawing Sheet

MAGNIFYING SPECTACLES

RELATED APPLICATION

This is a continuation of International Application No. PCT/GB97/02733, with an international filing date of Oct. 7, 1997.

BACKGROUND OF THE INVENTION

The present invention relates to a visual aid in the form of magnifying spectacles for use for cosmetic purposes, particularly as an aid for plucking the eyebrows.

Many people, particularly women, find it desirable to pluck their eyebrows periodically for cosmetic purposes and a magnifying mirror is commonly used to assist this process. However, a magnifying mirror is not always readily available and there is therefore a need for a compact and simple magnifying visual aid for this purpose.

There is a further problem in the case of those people who wear spectacles because the lenses of conventional spectacles prevent access to the eyebrows thereby necessitating the removal of the spectacles. However, the user is then frequently incapable of seeing their eyebrows with sufficient clarity to enable them to pluck their eyebrows with sufficient accuracy with the result that the user is frequently obliged to leave their spectacles in situ and to attempt to pluck their eyebrows behind their spectacle lens, which is both awkward and time consuming. A very similar problem arises for those women who wear spectacles when they wish to apply cosmetics, such as eyeliner or mascara, to their eyes. A problem also arises for those people who are shortsighted or longsighted but do not wear corrective spectacles.

U.S. Pat. No. 3,840,294 discloses spectacles for use in the application of eye make-up. The spectacles include a crosspiece which extends across the face of the user and which carries two upstanding lenses which are independently pivotable between an upright position, in which they extend over the eyes of the user, and a flapped-down position, in which the associated eye is exposed. The crosspiece includes a bridgepiece which extends over the nose of the user and which is situated in the same plane as the lenses, when they are in the upright position. No dimensions are given for the lenses but it is apparent from the drawings that they are some 40 mm or more high. This means that, as may be seen in the drawings of the specification, the lenses substantially obscure the eyebrows of the user and thus prevent access to them, when the lenses are in the upright position. When plucking the eyebrows the person concerned necessarily needs to have both eyes open since otherwise the necessary stereoscopic vision is not possible and it is therefore not possible to grasp an individual hair with the aid of tweezers. When both lenses of the spectacles of the prior document are in the upright position, the lenses prevent access to the eyebrows, particularly as the hands of the user necessarily approach the eyebrows from below. Eyebrow plucking is, therefore, impossible. If one lens is pivoted downwardly to provide access to the associated eyebrow, if that eye is closed and the user looks only through the other eye, eyebrow plucking is impossible for the reason explained above. If, however, the user keeps both eyes open, eyebrow plucking is also impossible due to the fact that one eye has a lens over it while the other does not which means that correctly focussed stereoscopic vision is impossible.

OBJECT AND SUMMARY OF THE INVENTION

Accordingly, it is the object of the invention to provide a visual aid which overcomes all the above problems and is simple, cheap and compact and, in particular, is of assistance not only in the application of make-up around the eyes but also in the plucking of the eyebrows.

According to the present invention there is provided a visual aid in the form of spectacles of the type including a crosspiece which extends, in use, across the face of the user and carries two lenses which extend upwardly from the crosspiece and, in use, over the eyes of the user and includes a bridgepiece which extends, in use, over the nose of the user, and two arms connected to respective ends of the crosspiece which extend over the sides of the face of the user and terminate at their free ends in respective curved ear engagement portions which extend, in use, over the top and at least partially down the rear of the ears of the user, the ear engagement portions being so shaped that they also extend up over a substantial proportion of the front of the ears of the user, characterised in that the two lenses are magnifying lenses which are between 25 mm and 40 mm wide and between 20 mm and 30 mm high, the apex of the bridgepiece being situated forward of the positions at which the lenses are connected to the crosspiece.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
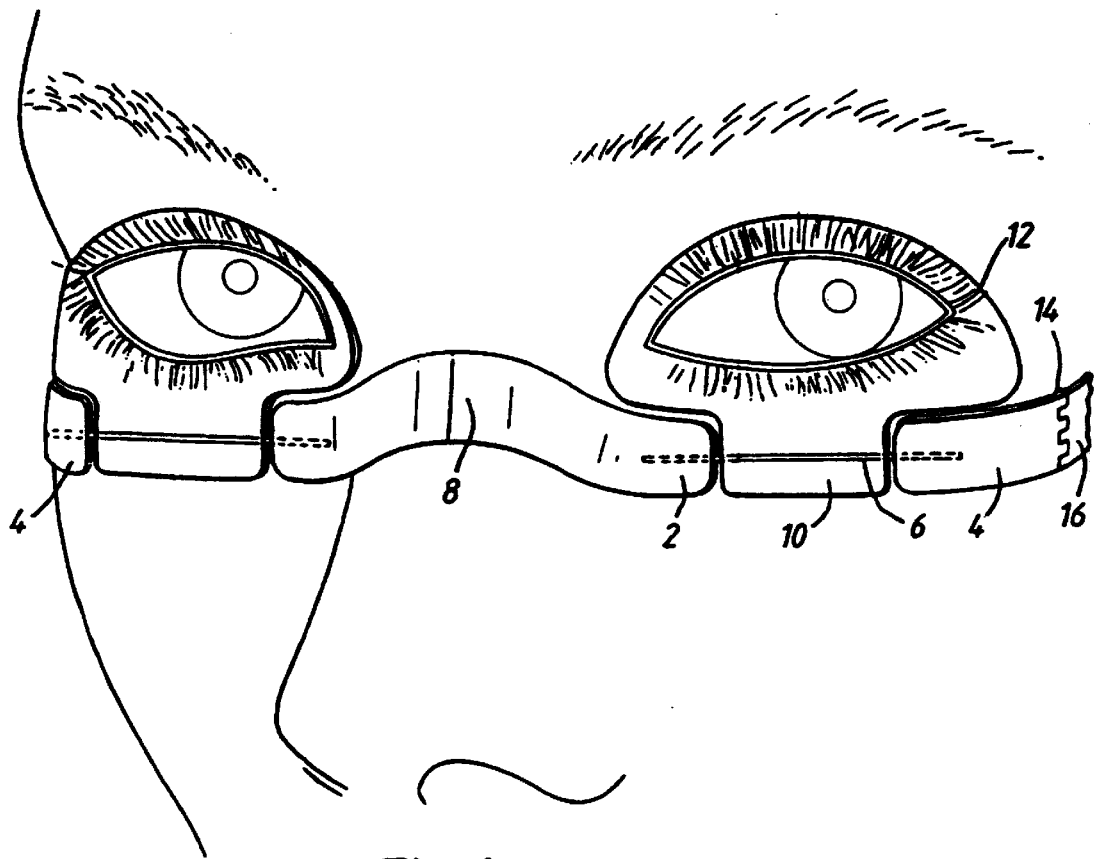
FIG. 1 is a front view of the spectacles in situ on a user, only part of whose face is shown.

It will be appreciated that whilst somewhat similar to conventional spectacles in overall appearance, the visual aid of the present invention is very different to conventional spectacles as regards both its construction and function. Thus the lenses are magnifying lenses which are very much smaller than conventional spectacle lenses and are positioned, in use, very much closer to the eye. The lenses are between 25 mm and 40 mm wide and between 20 mm and 30 mm high and this means in practice that they are not very substantially larger than the human eye. The effect of this is that the eyebrows are left fully exposed at all times and may thus be plucked with ease making use of the magnifying facility of the lenses. The fact that the lenses are closer to the eyes of the user than in conventional spectacles is made necessary by the fact that the lenses are rather smaller than in conventional spectacles and is made possible by the fact that the apex of the bridgepiece is situated forward of the positions at which the lenses are connected to the crosspiece, rather than behind them, as in conventional spectacles. Thus the bridgepiece is situated forward of the lenses when they are in the usual upright position. The magnifying function of the lenses will correct or compensate for any defect in the eyes of the user and permit the eyebrows to be clearly seen and thus reliably plucked.

Furthermore, in order that the eyebrows are fully accessible it is necessary that the crosspiece extends across the face of the user below the eyes rather than above them, as in conventional spectacles and thus that the lenses project upwardly from the crosspiece and not downwardly. In practice this will mean that the bridgepiece will sit rather lower on the bridge of the nose of the user than the bridgepiece of conventional spectacles.

Finally, in order to ensure that the side arms of the visual aid do not obstruct access to the eyebrows it is necessary that they extend not to the top of the ears of the user, as is conventional but to a rather lower point, e.g. towards the earhole or a point about half way down the ears of the user. This means in practice that the ear engagement portions of the arms are shaped to extend not only over the top and part way down the rear of the ears of the user but also part way up the front of the ears of the user. This will mean that the ear engagement portions will be something approximating to part-elliptical in shape or that they include a portion which extends initially upwardly from the generally horizontal portion of the arms extending across the side of the face of the user and then extends rearwardly and subsequently downwardly behind the ears. It will, however, be appreciated that it is not essential that the upwardly extending portions of the ear engagement portions extend vertically and are situated directly adjacent the ears of the user and they may instead be situated a short distance from the ears and may extend obliquely or at an angle rather than vertically.

Whilst the lenses may be fixed in position with respect to the crosspiece it is preferred that they are movable so that they may be moved for focussing purposes and may be moved away from the associated eye to permit access to the eyelid, e.g. for the application of mascara. The lenses are thus preferably pivotable with respect to the crosspiece, preferably about a generally horizontal axis and preferably through at least 90°, more preferably up to 180°, to permit completely unimpeded access to the eye and the surrounding area.

Since the lenses are rather smaller than in conventional spectacles, it may be desirable for their spacing to be adjustable. This may be achieved in a variety of ways but it is preferred that the crosspiece is divided into three portions, namely a central portion, which includes the bridgepiece, and two side portions, one end of each of which is connected to a respective end of the central portion by a respective pin, which constitutes the pivotal axis for the associated lens and which is of variable effective length. The pins connecting the portions of the crosspiece thus not only serve as the pivotal mounts for the lenses but their effective length may also be varied to vary the spacing of the lenses.

The variability in the effective length of the pins may be achieved in various ways, e.g. by making the pins of telescopic type, but it is preferred that at least one end, and preferably both ends, of each pin is received as a sliding fit in a hole in the adjacent end of the associated portion of the crosspiece.

Alternatively, the crosspiece may constitute a single member which includes regions of circular section on which the lenses are pivotally mounted and along which the lenses may be slid to vary their spacing.

Figure 2:
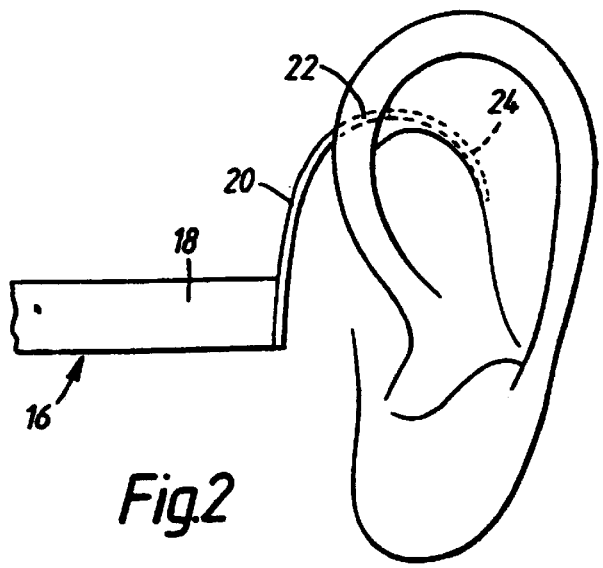
FIG. 2 is a view of one ear of the user and part of the associated spectacle arm.

Referring now to FIGS. 1 and 2 of the drawings, the spectacles include a crosspiece which is shaped to extend across, and in close proximity to, the face of the user at a position shortly below the eyes. The crosspiece includes a central portion 2 and two side portions 4 which are positioned end to end and are connected together by metallic pins 6 which are retained by virtue of a tight sliding fit, in holes in the opposed end of the central and side portions. The central portion 2 includes a bridge portion 8 which is shaped to extend over, and in contact with, the bridge of the nose of the user.

Each metallic pin 6 passes through and is rotatably received in a hole, in which it is a relatively tight sliding fit, in a respective lug or tab 10. The lugs 10 are integral with respective magnifying lenses 12 whose shape is generally similar to that of the human eye and which are not very significantly larger than the human eye. The width of the lenses is typically 35 mm and their height, which does not include the height of the associated lugs 10, is typically 25 mm. The lenses, which may be made of glass but are more preferably of plastic, extend across the eyes of the user and are very much closer to them than the lenses of conventional spectacles and are thus situated rearwardly of the bridge portion 8.

The free ends of the side portions 4 on the crosspiece are connected by respective hinges 14 to respective side arms 16 which extend rearwardly across the sides of the face of the user. This is, however, not essential and the crosspiece and the side arms may be integral with one another and made e.g. from flexible material. The side arms and crosspiece are preferably made of any conventional plastics material but any other appropriate material may also be used. Each side arm 16 includes a portion 18 which extends generally horizontally from below the eyes of the user to a position approximately half way down the ear of the user and terminates at its free end in an ear engagement portion. The ear engagement portion comprises a front portion 20 which extends upwardly along the front of the ear of the user, a top portion 22 which extends rearwardly over the top of the ear and a rear portion 24 which extends downwardly along the rear of the ear for a sufficient distance to ensure that the spectacles are adequately retained in position.

If a person should desire to pluck their eyebrows, the magnifying spectacles are located on the ears in the usual manner, after removing the corrective spectacles, if any, which are usually worn. The user then looks into a mirror and, after adjusting the angle of the magnifying lens, if necessary, to optimise focussing, the eyebrows may then readily be plucked with tweezers or the like by virtue of the fact that they are necessarily wholly exposed and accessible. If it should alternatively or additionally be desired to apply make-up to the eyes, the magnifying lenses are swung away in turn through 90° or more, i.e. up to 180°, to expose one eye and mascara or the like is then applied to that eye whilst looking through the other eye with the aid of the associated magnifying lens.

If it should be desired to alter the spacing of the two lenses, this may simply be achieved by pulling or pushing on the two side portions 4 in the direction of the length of the crosspiece. This will result in sliding of the metallic pin 6 in the holes formed in the opposed ends of the central portion 2 and the side portions 4 and thus in the effective length of the pins, that is to say the length of the pins which is exposed between the central portion 2 and the side portions 4 being altered and thus in the spacing of the lenses being altered also.

It will be understood that a number of modifications may be made to the specific embodiment described above. Thus instead of the front portions 20 of the ear engagement portions extending abruptly vertically from the horizontal side arms 16 immediately adjacent the ears they may be spaced a short distance from the ears and/or extend obliquely upwardly and rearwardly. Alternatively, the ear engagement portions 20 may merge into the arms 16 and together be of generally S shape. Additionally, instead of the crosspiece being in three parts it may be a single component with circular portions on which the lenses are pivotally mounted and are slidable towards and away from one another.

What is claimed is:

1. A visual aid in the form of spectacles comprising:

a crosspiece which extends in use across a face of a user and carries two lenses which extend upwardly from the crosspiece and, in use, over eyes of the user and includes a bridge piece which extends, in use, over a nose of the user; and two arms connected to respective ends of the crosspiece, said two arms extending over sides of the face of the user and terminate at their free ends in respective curved ear engagement portions which extend, in use, over a top and at least partially down a rear of ears of the user, the ear engagement portions being so shaped that they also extend up over a substantial proportion of the front of the ears of the user, the two lenses being magnifying lenses which are between 25 mm and 40 mm wide and between 20 mm and 30 mm high, the positions at which the lenses are connected to the crosspiece being recessed from an apex of the bridge piece, said lenses being sized and sufficiently recessed from the apex of the bridge piece to permit positioning of the lenses close to the user's eyes to provide ready access to the user's eyebrows from substantially all directions.

2. The visual aid of claim 1 in which each lens is pivotally connected to the crosspiece and is capable of movement through at least 90°.

3. The visual aid of claim 2 in which the crosspiece constitutes a central portion, which includes the bridgepiece, and two side portions one end of each of which is connected to a respective end of the central portion by a respective pin which constitutes the pivotal axis for the associated lens.

4. The visual aid of claim 3 in which each pin is of variable effective length.

5. The visual aid of claim 4 in which each end of each pin is received as a sliding fit in a hole in the adjacent end of the associated portion of the crosspiece.

6. The visual aid of claim 2 in which the crosspiece constitutes a single component affording circular section portions on which the lenses are respectively pivotally mounted.

7. The visual aid of claim 6 in which the lenses are pivotally mounted on the circular section portions so as to be slidable in the direction of the length thereof.

* * * * *